United States Patent
Maenosono et al.

(10) Patent No.: US 11,027,388 B2
(45) Date of Patent: Jun. 8, 2021

(54) MACHINING SYSTEM WITH INTERLOCK CIRCUIT

(71) Applicant: MAKINO J CO., LTD., Aiko-gun (JP)

(72) Inventors: Takudai Maenosono, Aiko-gun (JP); Takahiro Yoshida, Aiko-gun (JP); Nobuhiro Uchida, Aiko-gun (JP); Yuichi Aoyama, Aiko-gun (JP)

(73) Assignee: MAKINO J CO., LTD., Aiko-gun (JP)

( * ) Notice: Subject to any disclaimer, the term of this patent is extended or adjusted under 35 U.S.C. 154(b) by 176 days.

(21) Appl. No.: 16/331,386

(22) PCT Filed: Sep. 9, 2016

(86) PCT No.: PCT/JP2016/076682
§ 371 (c)(1),
(2) Date: Mar. 7, 2019

(87) PCT Pub. No.: WO2018/047306
PCT Pub. Date: Mar. 15, 2018

(65) Prior Publication Data
US 2019/0202015 A1     Jul. 4, 2019

(51) Int. Cl.
*B23Q 7/04* (2006.01)
*B23Q 11/08* (2006.01)
*B23Q 7/00* (2006.01)
*B23Q 11/00* (2006.01)
*B23Q 7/05* (2006.01)

(52) U.S. Cl.
CPC .............. *B23Q 7/047* (2013.01); *B23Q 7/00* (2013.01); *B23Q 7/05* (2013.01); *B23Q 11/00* (2013.01); *B23Q 11/08* (2013.01)

(58) Field of Classification Search
None
See application file for complete search history.

(56) References Cited

U.S. PATENT DOCUMENTS

| 4,545,630 A | * | 10/1985 | Izumi | ..................... G01D 11/24 |
| | | | | 177/238 |
| 5,216,246 A | * | 6/1993 | Weldman | ............... B23Q 11/08 |
| | | | | 250/229 |
| 8,789,312 B2 | | 7/2014 | Landerer | |

FOREIGN PATENT DOCUMENTS

JP           5539572          7/2014
JP        2014213431 A    *  11/2014

\* cited by examiner

*Primary Examiner* — Gerald McClain
(74) *Attorney, Agent, or Firm* — Morrison & Foerster LLP

(57) ABSTRACT

A machining system comprises a machining device that machines a workpiece, a set-up station with which pallet workpiece attachment/detachment is carried out, and a pallet conveyance device that conveys the pallet between the machining device and the set-up station. A partially cylindrical operator door, which can rotate around a set-up table on which the pallet is mounted, includes a partially cylindrical outer door and a partially cylindrical inner door which rotate following coaxial circular trajectories of different radii. The set-up station is provided with an interlocking mechanism that causes the outer door and the inner door to rotate in an interlocked manner so that a shielded state is constantly maintained between the operator side and the pallet conveyance device side.

5 Claims, 10 Drawing Sheets

MACHINING SYSTEM WITH INTERLOCK CIRCUIT

CROSS-REFERENCE TO RELATED APPLICATIONS

This application is a U.S. national phase patent application of International Patent Application No. PCT/JP2016/076682, filed Sep. 9, 2016, which is hereby incorporated by reference in the present disclosure in its entirety.

FIELD OF THE INVENTION

The present invention relates to a machining system comprising one or a plurality of processing machines for machining a workpiece, a setup station for performing attachment and detachment of the workpiece to and from a pallet, and a pallet transfer device for conveying and transferring a pallet on which the workpiece is fixed between the processing machine and the setup station.

BACKGROUND OF THE INVENTION

Conventionally, in machining systems comprising one or a plurality of processing machine for machining a workpiece, a setup station for performing attachment and detachment of a workpiece of a pallet, and a pallet transfer device for conveying and transferring a pallet on which the workpiece is fixed between the processing machine and the setup station, an operator door (safety door) is provided in the setup station that partitions the near side (operator side) and rear side (the pallet transfer device-side) of the setup station.

For example, Patent Literature 1 discloses a setup station comprising an operator door consisting of a semi-cylindrical outer door and a semi-cylindrical inner door that can be rotated along circular trajectories having different radii around a setup table, wherein when the operator door is opened, the outer door and the inner door isolate the operator-side and pallet transfer device-side of the setup station from each other at all times. In the setup station of Patent Literature 1, the outer door and the inner door of the operator door rotate in association with each other in opposite directions by means of pulleys and wire ropes.

In the setup station of Patent Literature 2, gears attached to each end of a shaft engage with respective ring gears attached to lower edges of door elements so that the door elements rotate in association with each other in opposite directions.

PATENT LITERATURE

[PTL 1] Japanese Patent No. 5539572
[PTL 2] U.S. Pat. No. 8,789,312

BRIEF SUMMARY OF THE INVENTION

In the setup station described in Patent Literature 1, since the operation angle of the outer door is less than 180°, there is a problem in that even when the operator door is fully opened, the opening width when the operator accesses a pallet on the setup table and a workpiece fixed to the pallet is small.

In the setup station described in Patent Literature 2, there is a problem in that it is necessary to provide ring gears at the lower ends of each of the door elements, whereby the manufacturing cost of the setup station increases dramatically.

The object of the present invention is to solve such problems of the prior art and to provide a machining system comprising a setup station in which the opening width is maximized with a simple structure.

In order to achieve the above object, according to the present invention, there is provided a machining system for machining a workpiece attached to a pallet, the machining system comprising a processing machine, for machining the workpiece, on which the pallet is interchangeably mounted, a pallet transfer device for conveying and transferring the pallet, a setup station for performing attachment and detachment of the workpiece on the pallet, the setup station comprising an operator door including a partially cylindrical outer door and a partially cylindrical inner door which define concentric circular tracks having different radii and which rotate around a setup table on which the pallet is placed, and an interlocking mechanism for rotating the outer door and the inner door in an interlocking manner so as to maintain a state in which an operator side and a pallet transfer device side are isolated from one another at all times, and a controller for controlling the operations of the processing machine, the pallet transfer device, and the setup station, the controller comprising an interlock circuit configured to prohibit a transfer operation of the pallet transfer device onto the setup table when the operator door is open, permit a transfer operation of the pallet transfer device onto the setup table when the operator door is closed, and permit operations other than the transfer operation of the pallet transfer device onto the setup table regardless of whether the operator door is open or closed.

According to the present invention, when an operator performs a setup operation, the operator door is located on the pallet transfer device-side in a state in which the outer door and the inner door overlap, whereby the operator-side and the pallet transfer device-side are isolated from each other. When transferring a workpiece or the like between the pallet transfer device and the setup table, the operator door is located on the operator-side in a state in which the outer door and the inner door overlap each other, whereby the operator-side and the pallet transfer device-side are isolated from each other. When shifting from a setup operation to a workpiece transfer operation or the like, and when shifting from a workpiece transfer operation or the like to a setup operation, due to the function of the interlocking mechanism, simple rotation operation of the outer door by the operator causes the inner door to rotate in synchronization with the outer door in the opposite direction, whereby the operator-side and the pallet transfer device-side are isolated from each other. With this simple configuration, the safety of the operator in the setup station is improved as compared with the conventional single safety doors.

Furthermore, in conventional single safety doors, since the operator-side and the pallet transfer device-side are not fully isolated from each other while the door is opening from a closed state to a fully opened state, even movement operations other than a transfer operation of the pallet transfer device to or from the setup table are prohibited for safety purposes. The interlock circuit of the controller of the present invention improves the availability of the pallet transfer device since movement operations of the pallet transfer device are permitted regardless of the opening or closing of the operator door.

Furthermore, the interlocking mechanism can be achieved with only mechanical elements that do not require complex control, for example, two pulleys and two wire ropes. By providing two handles on the outer door, the operator performs the rotation operation of the outer door using both hands, whereby there is no risk of fingers becoming pinched between the outer door and the inner door.

DETAILED DESCRIPTION OF THE INVENTION

Figure 1:
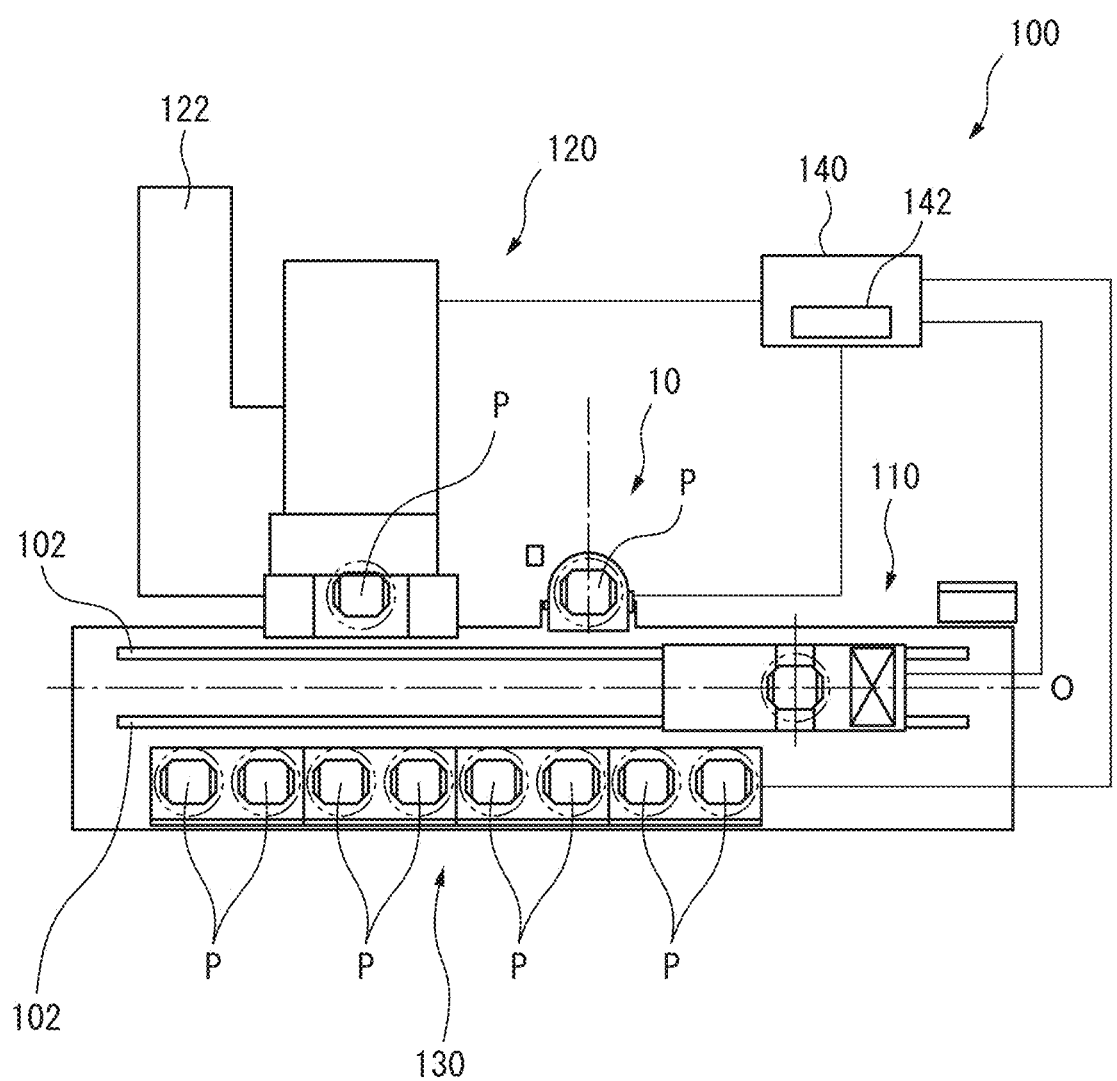
FIG. 1 is an approximate plan view showing a preferred embodiment of a machining system of the present invention.

With reference to FIG. 1, which is a schematic view of a machining system according to a preferred embodiment of the present invention, the machining system 100 comprises a pair of rails 102 which extend along a central axis line O and which form tracks for a pallet transfer device 110, a setup station 10 arranged on one side of the rails 102, a processing machine 120, and a pallet stacker 130 arranged on the side opposite the setup station 10 and the processing machine 120. The pallet transfer device 110 moves between the setup station 10, the processing machine 120, and the pallet stacker 130 along the rails 102 to convey and transfer pallets P on which workpieces W are attached.

The processing machine 120 can be a machining center comprising a spindle having a tool mounted on a tip thereof, a table, arranged so as to face the spindle, for attaching a pallet to which a workpiece is attached, and at least X, Y, Z orthogonal three-axis feed shafts for moving the spindle and the table relative to each other, a pallet exchange device, and a tool magazine 122. When the pallet transfer device 110 transfers a pallet P to the pallet exchange device, the pallet exchange device exchanges the pallet P with a pallet P on the table. The pallet transfer device 110 then transfers the pallet P of the pallet exchange device to the pallet transfer device 110 and conveys the pallet P to the setup station 10 or the pallet stacker 130.

In the setup station 10, an operator may remove the machined workpiece from the pallet P and discharge the machined workpiece to the outside of the machining system 100, or attach a unmachined workpiece to the pallet P, and load the pallet P into the machining system 100. The pallet transfer device 110 receives the pallet P having the unmachined workpiece fixed thereto, which is placed on a setup table 38, which is described later, conveys the pallet P to the pallet stacker 130, and the pallet P is stored in an unoccupied storage position in the pallet stacker 130. Furthermore, the pallet transfer device 110 receives the pallet P having the machined workpiece fixed thereon from the processing machine 120, conveys the pallet P to the setup station 10, and places the pallet P on the setup table 38 of the setup station 10. The pallet P having the machined workpiece fixed thereon may be temporarily stored in the pallet stacker 130.

Referring to FIG. 2 to FIG. 5, the setup station 10 according to the preferred embodiment of the present invention comprises, as primary constituent elements, a setup stand 12 which is fixed to a factory floor surface, an oil pan 14 arranged on the setup stand 12, a setup table 38 which is arranged in the oil pan 14 and which is integrally formed with the setup stand 12, a semi-cylindrical outer door 20 for partitioning the space above the oil pan 14 and the setup table 38 into an operator-side and a pallet transfer device-side, and a semi-cylindrical inner door 22 which has a diameter less than that of the outer door 20 and which is arranged concentrically with the outer door 20.

In the present embodiment, the outer door 20 and the inner door 22 are semi-cylindrical, i.e., are members which are partially cylindrical and which have opening angles of 180°. The inner door 22 has an opening width and inner diameter larger than the largest object to be attached to the pallet P, and it is sufficient that the outer door 20 have an opening diameter larger than this largest object. A window 74 through which an operator can view the space above the setup table 38 is provided in the outer door 20 and a corresponding window (not illustrated) is provided in the inner door 22. Furthermore, stoppers 40, 42 for limiting the operation ranges of the outer door 20 and the inner door 22 in the oil pan 14 are fixed in a stationary part such as, for example, the setup stand 12.

The oil pan 14 is formed as a container having an open top comprising a bottom wall including a semi-circular portion 14a concentric with the setup table 38, and a rectangular portion 14b having a long side having the same dimension as the diameter of the semi-circular portion 14a, and a side wall extending along the circumference of the bottom wall. Side walls 16, 18 are arranged on either sides of the rectangular portion 14b. In the oil pan 14, the semi-circular portion 14a is arranged on the operator-side, and the rectangular portion 14b is arranged on the pallet transfer device-side. The operator-side is a space for an operator operating in the setup station 10 and the pallet transfer device-side is a space in which the pallet transfer device 110 is arranged.

The outer door 20 comprises at least one, preferably two handles 36, 37 attached to the outer surface of the door 20 which an operator can grasp to operate the outer door 20. The two handles 36, 37 of the outer door 20 are arranged on one side edge part of the outer door 20 in the circumferential direction, in particular, in the vicinity of the side edge part serving as the trailing edge side when the outer door 20 rotates around the setup table 38 from the position at which the operator-side is closed and the pallet transfer device-side is open (the position shown in FIGS. 1, 3, and 4) to the position in which operator-side is open and the pallet transfer device-side is closed.

Figure 4:
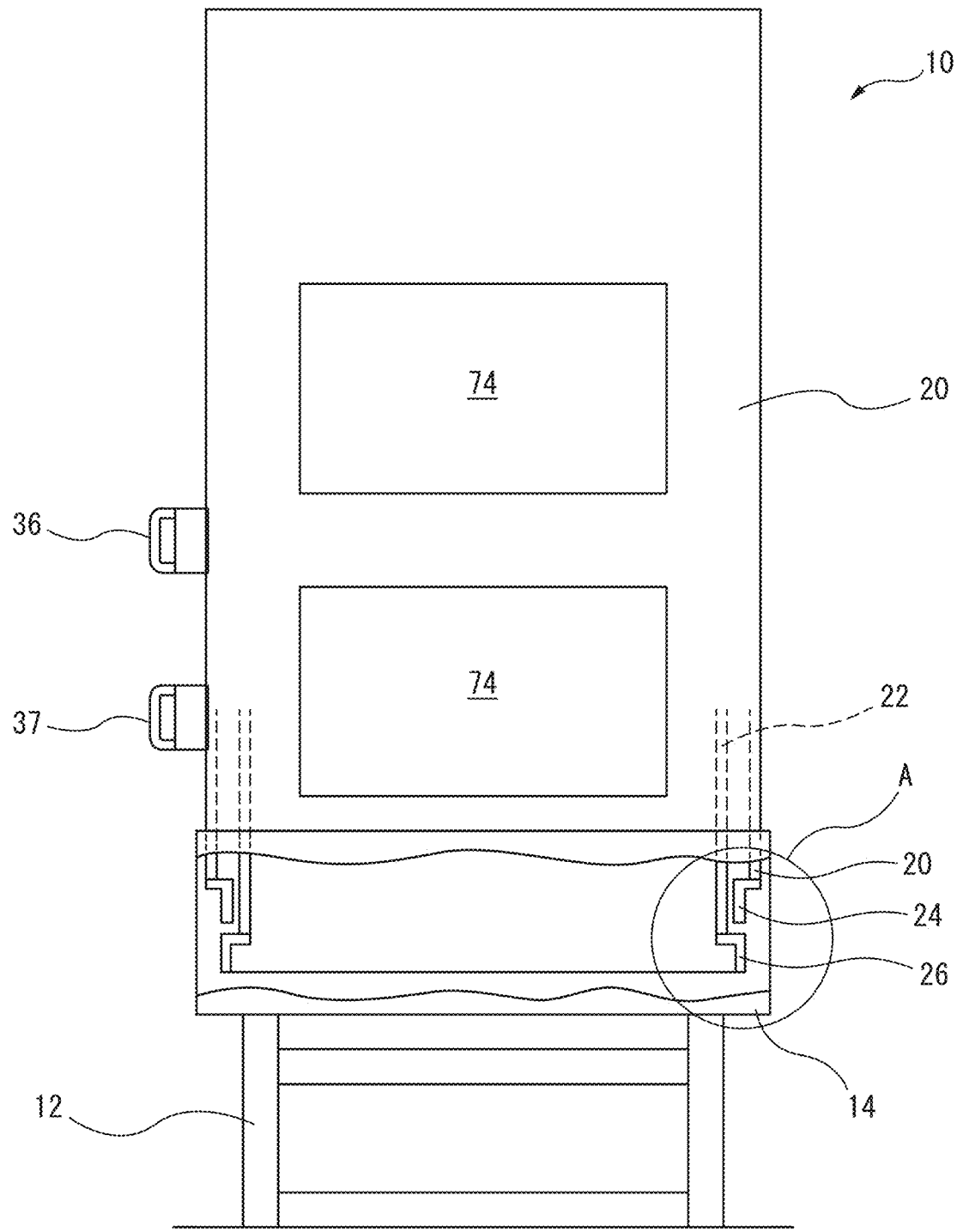
FIG. 4 is an approximate schematic view of the setup station of FIG. 1 in a state in which the operator-side is closed.
Figure 5:
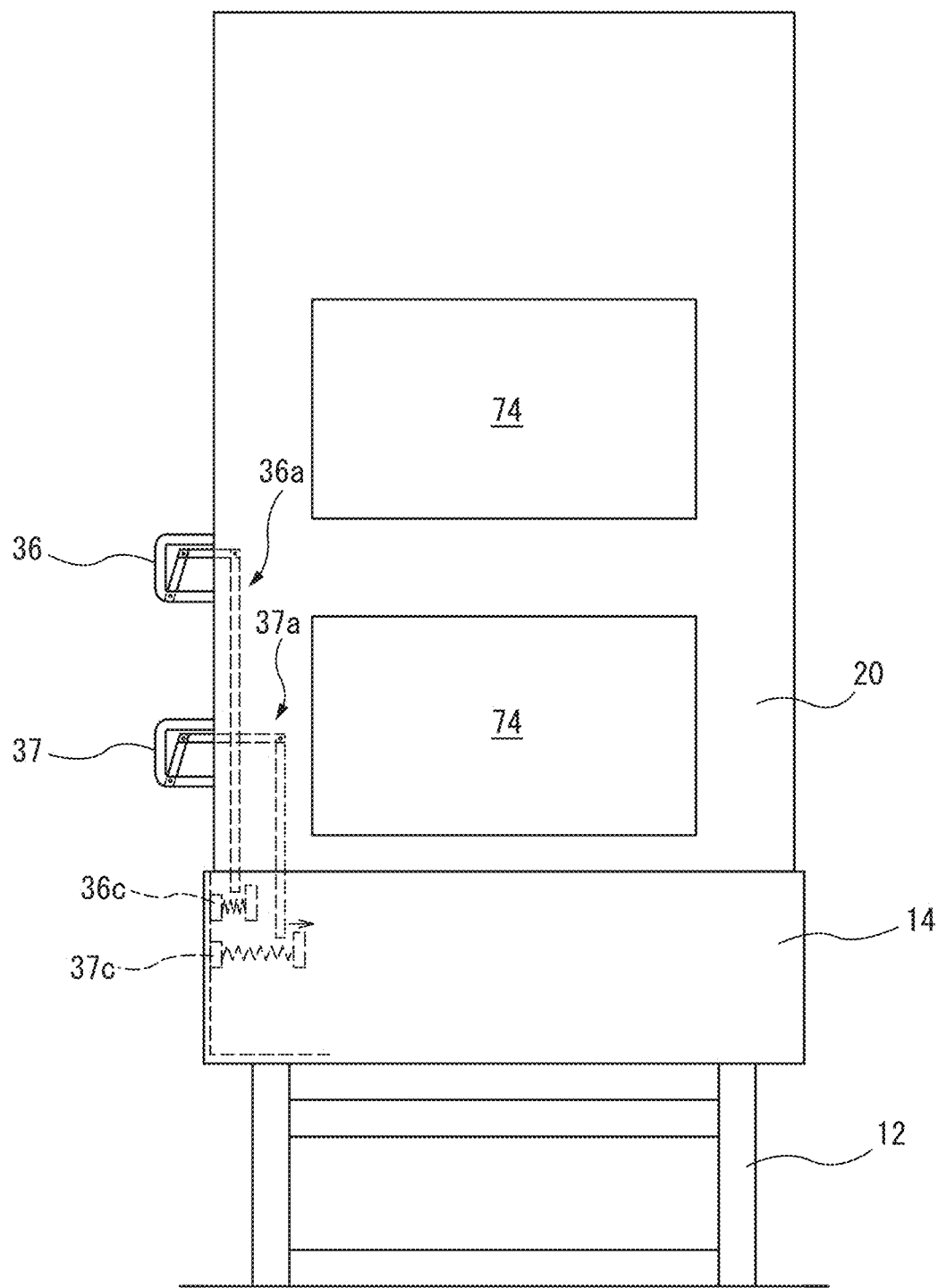
FIG. 5 is a front view of a setup station identical to that of FIG. 3, in particular, showing the configuration of a linkage between a lever provided on a handle and a brake of an outer door.

Furthermore, the setup station 10 includes a brake for stopping the rotation operation of the outer door 20. In the present embodiment, the brake includes brake shoes 36c, 37c which are biased against a stationary surface of the setup station 10, for example, the inner wall of the side wall of the semi-circular portion 14a of the oil pan 14. As shown in FIG. 4, levers 36b, 37b connected to link mechanisms 36a, 37a are provided on the handles 36, 37. When the operator grasps the handles 36, 37, by simultaneously operating the levers 36b, 37b, the brake shoes 36c, 37c separate from the inner surface of the side wall of the semi-circular portion 14a of the oil pan 14, whereby the outer door can be moved. In particular, as in the present embodiment, by providing two handles 36, 37 on the outer door 20, and providing levers 36b, 37b for operating the brake on the two handles 36, 37, since the operator always holds the two handles 36, 37 with both hands and must operate each lever 36b, 37b when opening or closing the outer door 20, when the outer door 20 is opened or closed, injury to the operator due to an accident in which a body part such as a finger becomes trapped between the outer door 20 and the side walls 16, 18 or the inner door 22 can be prevented.

Figure 6:
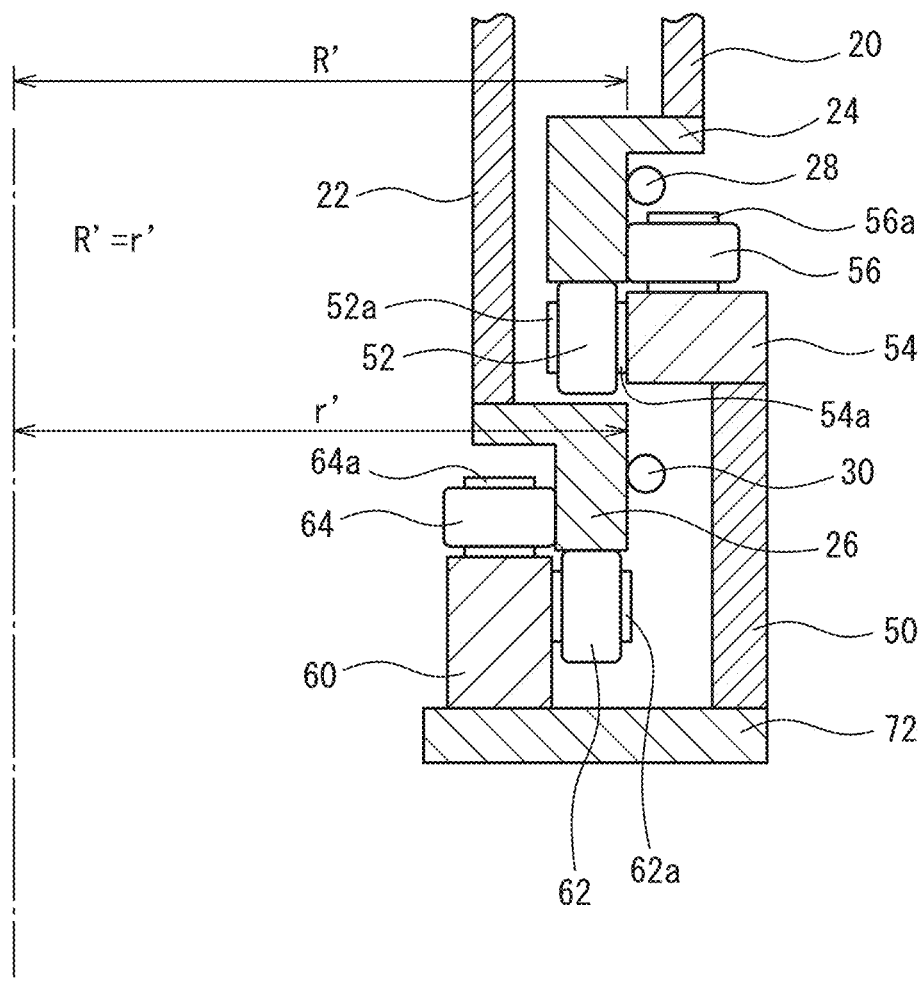
FIG. 6 is an enlarged schematic view showing the form of the portion represented by A in FIG. 3.

Referring to FIG. 6, the outer door 20 and the inner door 22 further comprise an outer door cylindrical part 24 and an inner door cylindrical part 26, respectively, connected to the bottom ends thereof. The outer door cylindrical part 24 and the inner door cylindrical part 26 are arranged concentric with the setup table 38. The outer door cylindrical part 24 and the inner door cylindrical part 26 are supported on a circular outer rail 50 and inner rail 60, respectively, which are arranged concentric with the setup table 38 so as to surround the setup table 38 in the oil pan 14. Furthermore, engaging parts 44, 46 are attached to the outer door cylindrical part 24 and the inner door cylindrical part 26, respectively, so as to be capable of engaging with the stoppers 40, 42.

The outer rail 50 and the inner rail 60 are fixed to the upper surface of a common annular base member 72 extending along a circumference concentric with the setup table 38. The outer rail 50 and the inner rail 60 have a plurality of outer vertical support rollers 52 and inner vertical support rollers 62, respectively, arranged at equal intervals along the outer rail 50 and the inner rail 60.

The outer vertical support rollers 52 are attached to the outer rail 50 via a bracket 54 attached to an upper end part of the outer rail 50. The bracket 54 protrudes radially and inwardly from the outer rail 50. The outer vertical support rollers 52 are rotatably mounted on horizontally extending roller shafts 52a, which are attached to the bracket 54. The roller shafts 52a extend in radial directions and are attached to the inner edges of the bracket 54 or are attached to the radially inward side tips 54a.

Though the bracket 54 can be a single annular member or can be formed from a plurality of segments, the bracket 54 has a shape and dimensions such that the tips 54a of the inner edge or radially inward side are positioned on the same circumference so that all of the plurality of outer vertical support rollers 52 are arranged on the same circumference.

The inner vertical support rollers 62 are attached at equal intervals along the outer peripheral surface of the inner rail 60 adjacent to the upper end of the inner rail 60, respectively. More specifically, the inner vertical support rollers 62 are rotatably supported on horizontally mounted roller shafts 62a that are radially oriented on the inner rail 60. As can be understood from FIG. 6, the outer vertical support rollers 52 and the inner vertical support rollers 62 are arranged at different heights but are arranged between the outer rail 50 and the inner rail 60 on circumferences having the same radius.

Furthermore, a plurality of outer horizontal support rollers 56 and inner horizontal support rollers 64 are attached to the upper ends of the outer rail 50 and the inner rail 60. The outer horizontal support rollers 56 are rotatably attached to roller shafts 56a which are attached to the upper surface of the bracket 54 and which extend in the vertical directions. The inner horizontal support rollers 64 are rotatably attached to roller shafts 64a which are attached to the upper surface of the inner rail 60 and which extend in the vertical directions. The outer horizontal support rollers 56 and the inner horizontal support rollers 64, when assembled, abut the outer peripheral surface of the outer door cylindrical part 24 and the inner surface of the inner door cylindrical part 26, respectively.

The outer door 20 has first and second pins 20a, 20b which are fixed thereto at a lower portion of one side edge in the circumferential direction thereof so as to protrude from the outer surface of the outer door cylindrical part 24. The inner door 22 includes third and fourth pins 22a, 22b which are fixed thereto at a lower portion of the peripheral portion opposite the first and second pins 20a, 20b of the outer door 20 so as to protrude from the outer surface of the inner door cylindrical part 26.

Furthermore, a pair of left and right first and second pulleys 32, 34 are attached to the inner surface of a side wall of the rectangular portion 14b of the oil pan 14 facing the pallet transfer device-side. The first and second pulleys 32, 34 are attached so as to be rotatable about the rotary shafts 32a, 34a thereof, respectively, and so as to be capable of pivoting about pivot shafts 32b, 34b extending horizontally in the oil pan 14 from the inner surface of the side wall facing the pallet transfer device-side, as indicated by arrow A.

The outer door 20 and the inner door 22 are connected to each other via the first and second wire ropes 28, 30 which constitute the interlocking mechanism, and move in opposite directions in association with each other along the outer rail 50 and the inner rail 60. In the present embodiment, one end of the first wire rope 28 is connected to the first pin 22a of the inner door 22, and the other end of the first wire rope 28 is connected to the second pin 20b of the outer door 20. Likewise, one end of the second wire rope 30 is connected to the first pin 20a of the outer door 20 and the other end of the second wire rope 30 is connected to the second pin 22b of the inner door 22.

Figure 2:
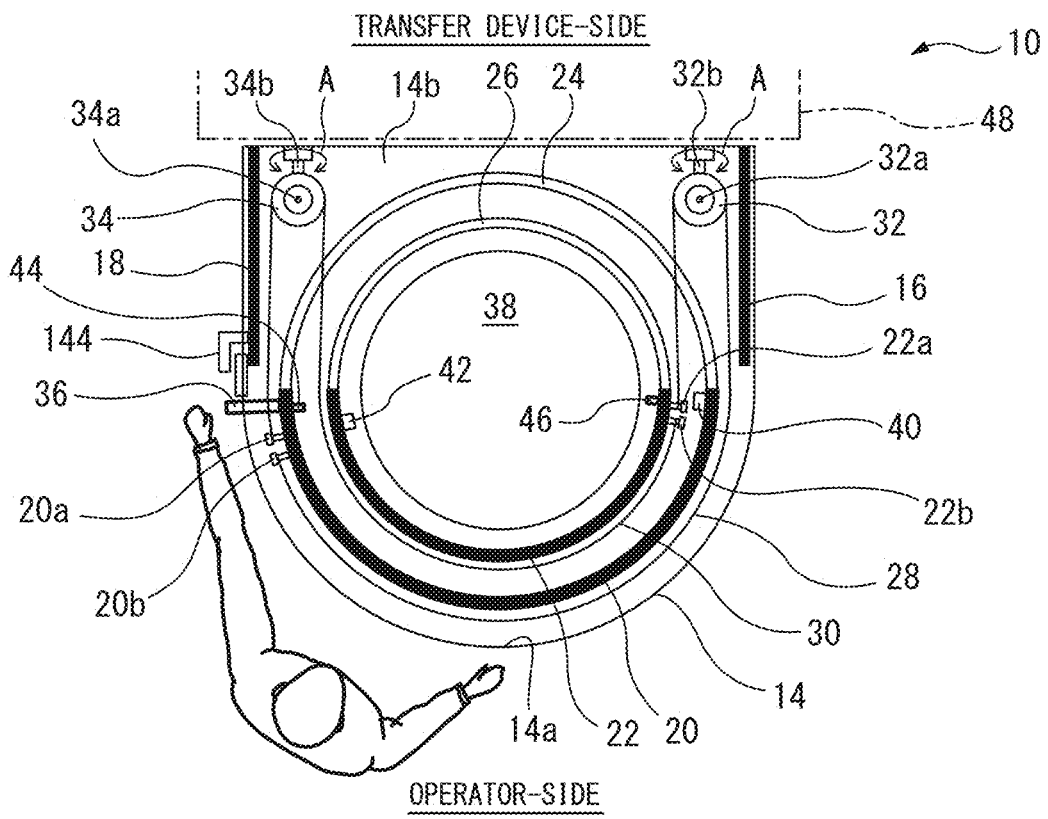
FIG. 2 is an approximate plan view of a setup station according to the preferred embodiment of the present invention showing a state in which an operator-side is closed and a pallet transfer device-side is open.
Figure 3:
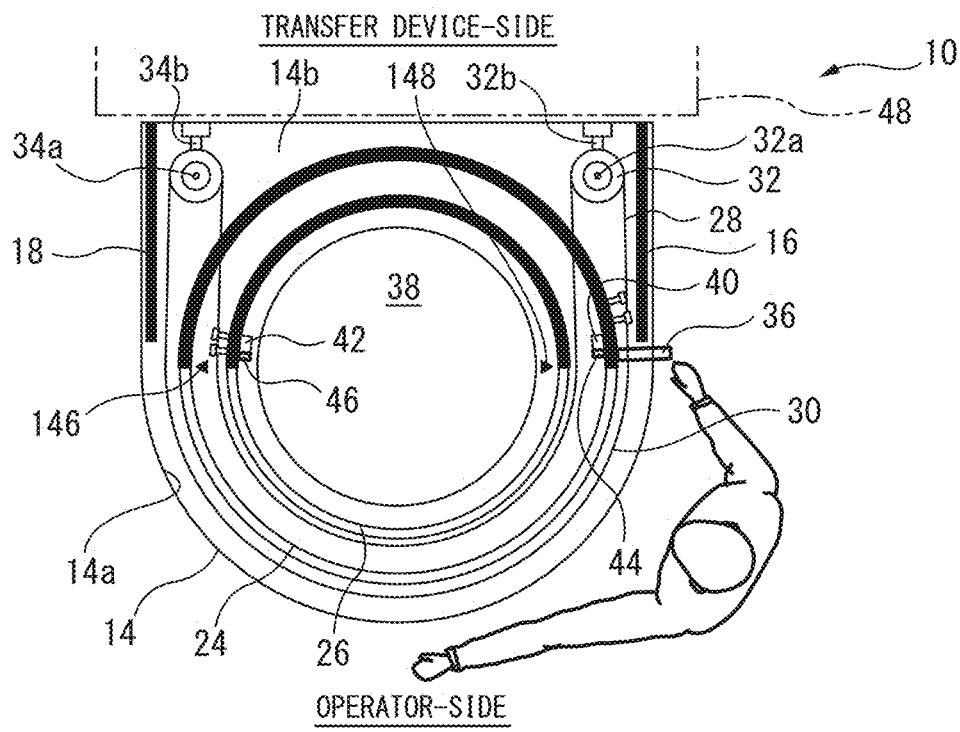
FIG. 3 is a view showing a state in which the operator-side of the setup station of FIG. 1 is open and the pallet transfer device-side is closed.

As shown in FIGS. 2 and 3, the first wire rope 28 extends from the first pin 22a of the inner door 22 to the second pin 20b of the outer door 20 along the outer circumferential surface of the outer door cylindrical part 24 of the outer door 20 via the first pulley 32 with a tension sufficient to prevent slack. Likewise, the second wire rope 30 extends from the first pin 20a of the outer door 20 to the second pin 22b of the inner door 22 along the outer circumferential surface of the inner door 22 via the second pulley 34 with a tension sufficient to prevent slack.

As described above, since the outer door cylindrical part 24 and the inner door cylindrical part 26 are formed from cylindrical members having substantially identical diameters, the first and second wire ropes 28, 30 extend along circumferences of approximately the same radius with respect to the center of the outer door 20 and the inner door 22, and therefore have substantially the same lengths, as shown in FIG. 6. Furthermore, the first and second wire ropes 28, 30 extend without interfering with the lower end of the outer door cylindrical part 24 due to the height difference between the outer door cylindrical part 24 and the inner door cylindrical part 26 and the height difference between the pins 20a, 20b and the pins 22a, 22b.

FIGS. 7A to 7E illustrate rotation and movement from the state in which both the outer door 20 and the inner door 22 are located on the operator-side to the state in which both the outer door 20 and the inner door 22 are located on the pallet transfer device-side. In FIGS. 2, 3, and 7A to 7E, since the outer door cylindrical part 24 and the inner door cylindrical part 26 have substantially identical diameters, though the wire ropes 28, 30 are illustrated in an overlapping manner, the rotation axes of the pulley 32, 34 are illustrated so as to face the horizontal direction, for the sake of clarity, the wire ropes 28, 30 are illustrated in a non-overlapping manner, and the rotation axes of the pulley 32, 34 are illustrated so as to face the vertical direction.

Figure 7A:
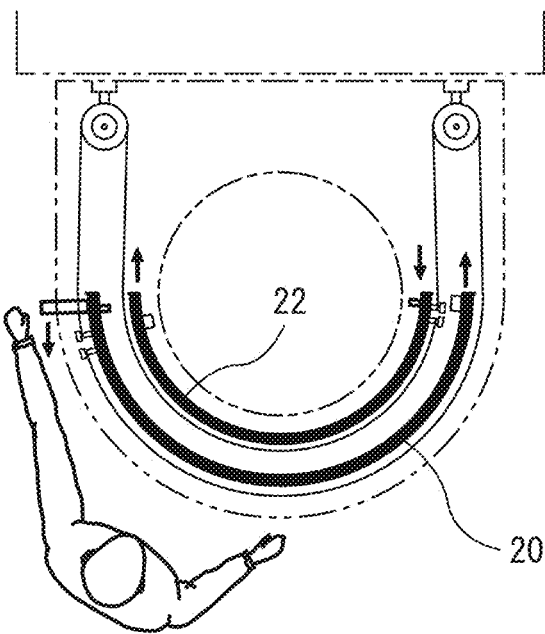
FIG. 7A is a schematic view detailing the operation of the setup station of the present invention.
Figure 7B:
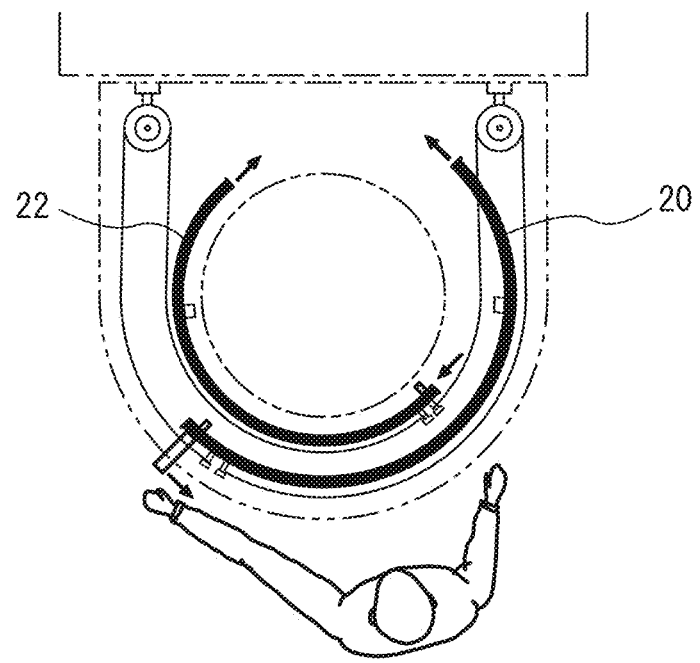
FIG. 7B is a schematic view detailing the operation of the setup station of the present invention.
Figure 7C:
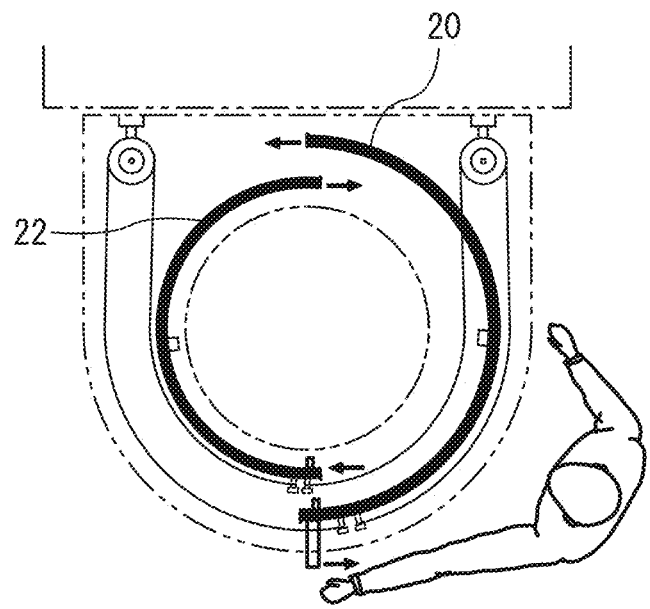
FIG. 7C is a schematic view detailing the operation of the setup station of the present invention.
Figure 7D:
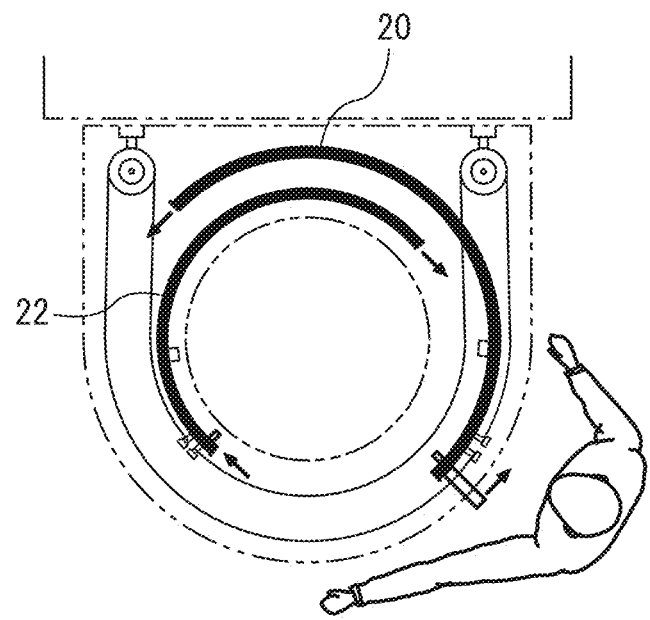
FIG. 7D is a schematic view detailing the operation of the setup station of the present invention.
Figure 7E:
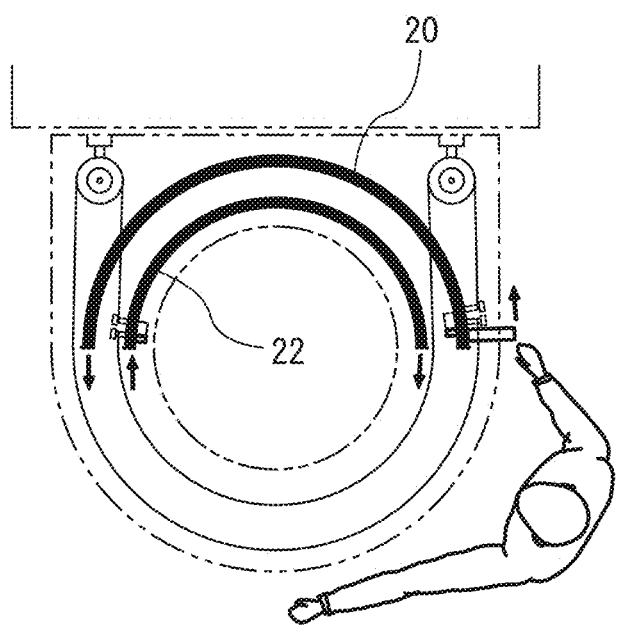
FIG. 7E is a schematic view detailing the operation of the setup station of the present invention.

In FIG. 7A, the operator releases the brakes by gripping the handles 36, 37 of the outer door 20 with both hands and operating the levers 36b, 37b, whereby the brake shoes 36c, 37c separate from the stationary surface of the setup station 10. After the brakes have been released, the operator rotates in the outer door 20 from the position in which the operator-side is closed (FIG. 7A) to the position in which the pallet transfer device-side is closed (FIG. 7E) in the counterclockwise direction of FIGS. 7A to 7E centering on the setup table 38. As a result, the inner door 22 is rotationally moved by the first and second wire ropes 28, 30 from the position in which the operator-side is closed (FIG. 7A) to the position in which the pallet transfer device-side is closed (FIG. 7E) in the direction opposite the direction of rotation of the outer door, i.e., in the clockwise direction of FIGS. 7A to 7E.

As described above, the first and second wire ropes 28, 30 extend along the outer surfaces of the outer door cylindrical part 24 and the inner door cylindrical part 26 at different heights and without slack. Furthermore, since the first and second pulleys 32, 34 pivot about the horizontal pivot shafts 32b, 34b, the shaking of the first and second wire ropes 28, 30 accompanying the rotation operations of the outer door 20 and the inner door 22 is compensated to ensure the smooth operation of the first and second wire ropes 28, 30.

Thus, in the setup station 10, the outer door 20 and the inner door 22 can move from a position in which the operator-side of the setup station 10 is closed and the pallet transfer device-side is open (FIG. 7A) to the position in which the operator-side is open and the pallet transfer device-side is closed (FIG. 7E), whereby the operator can access the space above the setup table 38, which is the working space of the setup station 10.

By performing an operation opposite to the operation described above, the outer door 20 and the inner door 22 can move from the position in which the operator-side of the setup station 10 is open and the pallet transfer device-side is closed (FIG. 7E) to the position in which the operator-side is closed and the pallet transfer device-side is open (FIG. 7A).

During movement of the outer door 20 and the inner door 22, in the space above the setup table 38, which is the working space of the setup station 10, since either or both of the outer door 20 and the inner door 22 are always present between the operator-side and the pallet transfer device-side, it is impossible for the operator to view the pallet transfer device-side from the operator-side. As a result, the setup station 10 of the present embodiment is significantly safer than the setup stations according to the prior art.

Furthermore, since the diameters of the outer door cylindrical part 24 and the inner door cylindrical part 26, around which the wire ropes 28, 30 extend, are substantially identical, the rotation angles of the outer door 20 and the inner door 22 are equal to each other, whereby the opening angle on the operator-side and the opening angle on the pallet transfer device-side can both be 180°. Specifically, a machining system comprising a setup station having the greatest possible opening width has been realized by a simple structure.

Further, during operation of the processing machine, the pallet exchange device, the transportation carriage, and the pallet handling robot, arranged on the pallet transfer device-side, it is possible to provide a mechanism that prevents operation of the levers 36b, 37b to actuate an interlock, e.g., a brake, that prevents operation of the outer door 20 and the inner door 22, or alternatively, a mechanism which prevents operation of the link mechanisms 36a, 37a. Conversely, an interlock which can prevent operation of the processing machine or the pallet exchange device, transportation carriage, pallet handling robot, etc., during operation of the outer door 20 and the inner door 22, specifically, when the outer door 20 and inner door 20 are not in the state shown in FIG. 7A or FIG. 7E, may be provided.

Such an interlock can be provided as an interlock circuit 142 of a controller 140 for controlling the machining system 100. Furthermore, the interlock circuit 142 may have functions to prevent transfer operations by the pallet transfer device 110 to the setup table 38 when the operator door is open, enable transfer operations by the pallet transfer device 110 to the setup table 38 when the operator door is closed, and to enable, for example, transport and movement operations other than transfer operations by pallet transfer device to the setup table 38 regardless of the opening and closing of the operator door. As a result of these functions, even while the operator door is changing from a closed state to a fully open state, the transportation and movement operations of the pallet transfer device 110 can be performed, and the operation rate of the pallet transfer device 110 can be improved as compared to conventional single safety doors.

An example of the interlock circuit 142 will be described as follows.

When it is detected by a door lock switch 144 (FIG. 2) provided between the outer door 20 and the side wall 18 that the outer door 20 is closed and locked, transfer operations by the pallet transfer device 110 to the setup table 38 are enabled. When it is detected that the outer door 20 is even slightly open, transfer operations by the pallet transfer device 110 to the setup table 38 are prevented, and other movements or the like are enabled.

Furthermore, during transfer operations by the pallet transfer device 110 to the setup table 38, the lock of the door lock switch 144 is not released.

When the door lock switch 144 continues to detect the open state of the outer door 20 for a predetermined interval or longer, the operator may have forgotten to close the operator door, and since the transfer operations by the pallet transfer device 110 to the setup table 38 continue to be prevented, a warning is issued from the viewpoint of the prevention of a reduction of availability of the machining system 100.

Limit switches 146, 148 (FIG. 3) which detect the fully open states of the outer door 20 and the inner door 22 are provided. The case in which both of the limit switches 146, 148 detect open states is normal. However, when only one of the limit switches indicates an open state, it is determined that an abnormality such as a disconnection of the wire ropes 28, 30 has occurred, and an alarm is issued.

Furthermore, in the above explanation, though the case in which two handles 36, 37 are provided on the outer door 20 and levers 36b, 37b for the respective braking operations thereof are provided has been explained, in the case in which only a single handle is provided, the operator grasps the single handle with a single hand and rotates the outer door 20 about the setup table 38, as described above. Alternatively, when the setup station 10 does not comprise a brake for the outer door 20, the operator can rotate the outer door 20 without releasing the brake. The setup station of the present invention is not limited to the attachment and detachment of workpieces to and from pallets. A station in which various setup operations such as washing and measuring workpieces, the setup of tools and fixtures, etc., are performed is encompassed thereby.

Note that in the embodiment described above, the setup table 38 is formed integrally with the setup stand 12, and cannot move. However, the present invention is not limited thereto, and the setup table may slide horizontally in the forwards and backwards directions relative to the setup stand 12.

With reference to FIGS. 8A to 9B, the slidable setup table 39 is provided so as to be capable of sliding between a distal position in the vicinity of the rail 102 of the pallet transfer device 110 (FIGS. 8A, 8B) and a proximal position in the vicinity of the operator (FIGS. 9A, 9B) in the horizontal direction with respect to the setup stand 12 by appropriate guiding means such as guide rails (not illustrated). A drive mechanism 80 for sliding the setup table 39 between the distal position and the proximal position is provided in the setup station 10.

The drive mechanism 80 comprises a drive pulley 82 provided so as to be rotatable around an axis OP1 which extends in the horizontal direction perpendicular to the sliding direction of the setup table 39, a driven pulley 84 which is provided so as to be rotatable around an axis OP2 parallel to the axis OP1, a belt 86 which extends between the drive pulley 82 and the driven pulley 84, a rotating arm 90 which extends along the axis OP2 and which is connected to the driven pulley 84 via a drive shaft 88, a cam follower 92 attached to the tip of the rotating arm 90, and a cam 94 which is connected to the setup table 39 and which is engaged with the cam follower 92.

Figure 8A:
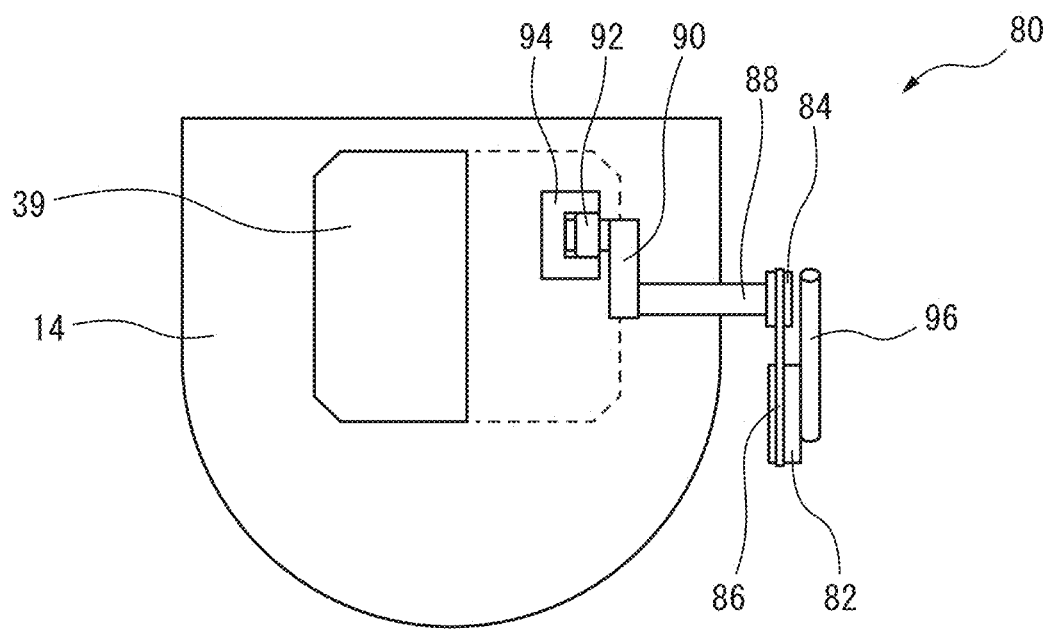
FIG. 8A is a plan view of a slidable setup table at a distal position.
Figure 8B:
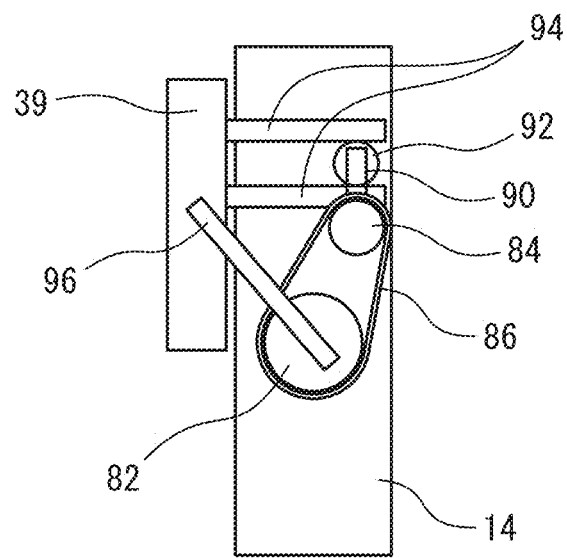
FIG. 8B is a side view of the setup table of FIG. 8A.
Figure 9A:
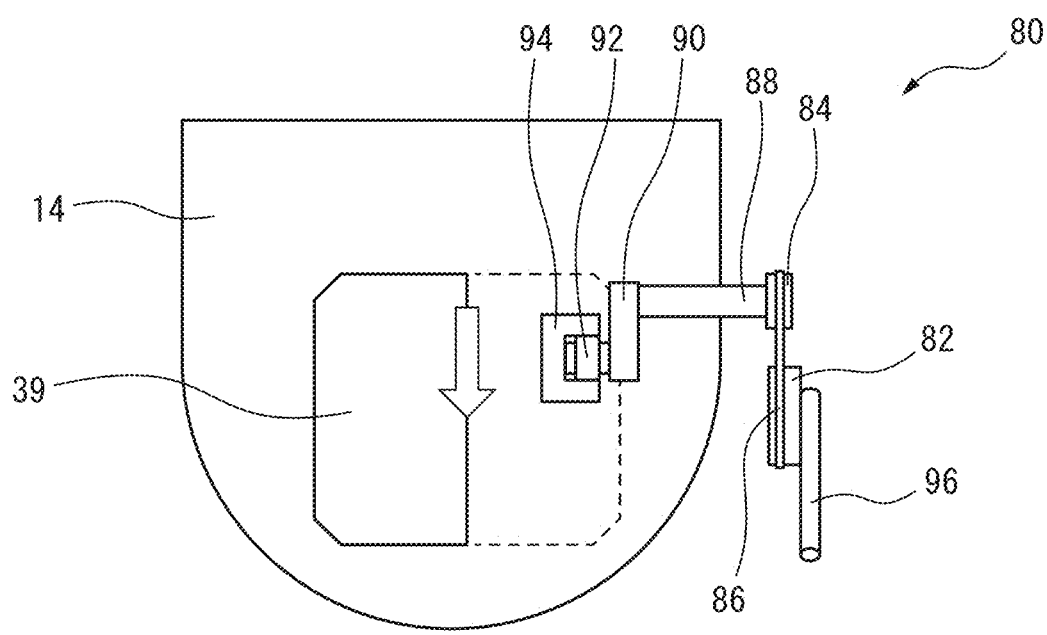
FIG. 9A is a plan view of a slidable setup table at a proximal position.
Figure 9B:
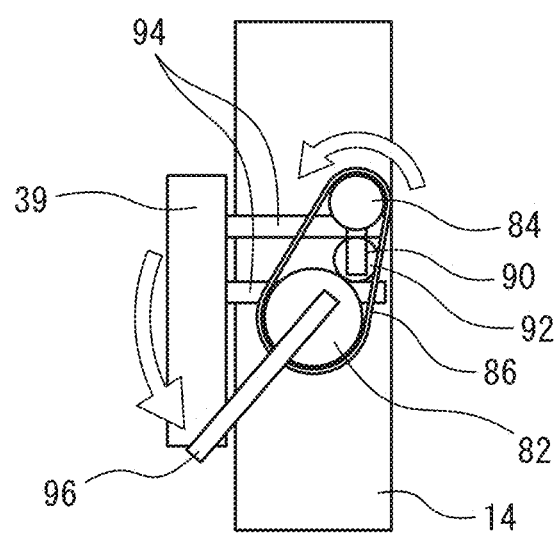
FIG. 9B is a side view of the setup table of FIG. 9A.

When the operator operates the lever 96 connected to, for example, the drive pulley 82, to rotate the drive pulley 82, the setup table 39 can move horizontally between the distal position shown in FIGS. 8A and 8B and the proximal position shown in FIGS. 9A and 9B. Thus, since the table of setup station 10 is slidable between the distal position and the proximal position in the horizontal direction, in the case in which, for example, a setup station 10 of the existing machining system 100 is exchanged or a setup station 10 is introduced to the existing machining system 100, the setup station 10 can be adapted to the machining system 100, which includes various types of processing machines 120.

REFERENCE SIGNS LIST

10 Setup Station
16 Side Wall
18 Side Wall
20 Outer Door
22 Inner Door
24 Outer Door Cylindrical Part
26 Inner Door Cylindrical Part
28 First Wire Rope
30 Second Wire Rope
32 First Pulley
34 Second Pulley
36 Handle
37 Handle
38 Setup Table
100 Machining System
110 Pallet transfer device
120 Processing Machine
130 Pallet Stacker
140 Controller
142 Interlock Circuit

The invention claimed is:

1. A machining system for machining a workpiece attached to a pallet, the machining system comprising:
a processing machine for machining the workpiece, the pallet being interchangeably mounted thereto;
a pallet transfer device for conveying and transferring the pallet;
a setup station for performing attachment and detachment of the workpiece on the pallet, the setup station comprising an operator door including a partially cylindrical outer door, a partially cylindrical inner door which define concentric circular tracks having different radii and which rotate around a setup table on which the pallet is placed, an outer door cylindrical part provided on a lower end of the outer door, and an inner door cylindrical part provided on a lower end of the inner door, and an interlocking mechanism for rotating the outer door and the inner door in association with each other wherein the outer door cylindrical part and the inner door cylindrical part have equal diameters and are arranged at different heights, thereby the outer door and the inner door are rotated in opposite directions in association with each other so that the rotation angles of the outer door and the inner door are equal so as to maintain an operator side and a pallet transfer device side are isolated from one another at all times; and
a controller for controlling the operations of the processing machine, the pallet transfer device, and the setup station, the controller comprising an interlock circuit configured to prohibit a transfer operation of the pallet transfer device onto the setup table when the operator door is open, and permit a transfer operation of the pallet transfer device onto the setup table when the operator door is closed.

2. The machining system according to claim 1, wherein a plurality of support rollers for supporting the outer door cylindrical part are disposed along the circumference thereof, a plurality of support rollers for supporting the inner door cylindrical part are disposed along the circumference thereof, and the support rollers for the outer door and the support rollers for the inner door are arranged on circumferences having identical diameters and located at different heights.

3. The machining system according to claim 1, wherein the setup table is provided so as to be slidable in the horizontal directions between a distal position near the pallet transfer device and a proximal position near an operator.

4. The machining system according to claim 1, wherein the outer door comprises two handles for rotating the outer door.

5. The machining system according to claim 1, wherein the interlocking mechanism comprises a first pulley and a second pulley, which are rotatably attached to a fixed part of the setup station, and a first wire rope and a second wire rope for connecting the outer door cylindrical part and the inner door cylindrical part;

the inner door cylindrical part comprises first and second connection points adjacently arranged on the outer peripheral surface thereof, and the outer door cylindrical part comprises third and fourth connection points adjacently arranged on the outer peripheral surface thereof;

one end of the first wire rope is connected to the first connection point, the first wire rope extends through the first pulley and along the outer peripheral surface of the outer door cylindrical part, and the other end of the first wire rope is connected to the fourth connection point; and one end of the second wire rope is connected to the third connection point, the second wire rope extends through the second pulley and along the outer peripheral surface of the inner door cylindrical part, and the other end of the second wire rope is connected to the second connection point.

\* \* \* \* \*